United States Patent [19]
Spindler

[11] 3,789,192
[45] Jan. 29, 1974

[54] ELECTRICALLY HEATED WINDOW WITH A TEMPERATURE SENSOR

[75] Inventor: Robert G. Spindler, Allison Park, Pa.

[73] Assignee: PPG Industries, Inc., Pittsburgh, Pa.

[22] Filed: Sept. 1, 1972

[21] Appl. No.: 285,780

Related U.S. Application Data

[63] Continuation-in-part of Ser. No. 199,221, Nov. 16, 1971, abandoned.

[52] U.S. Cl. ............... 219/522, 161/183, 219/203, 219/494, 219/543, 219/544, 338/24, 338/253, 338/270, 338/301
[51] Int. Cl. ............................................. H05b 3/06
[58] Field of Search ... 219/203, 494, 501, 504, 522, 219/543, 544; 338/20, 21, 22, 23, 24, 25, 253, 270, 297, 301; 161/183, 190, 199

[56] References Cited
UNITED STATES PATENTS

| | | | |
|---|---|---|---|
| 2,644,065 | 6/1953 | Peterson | 219/522 X |
| 2,806,118 | 9/1957 | Peterson | 219/203 |
| 3,356,833 | 12/1967 | Orcutt | 219/522 |
| 1,476,116 | 12/1923 | Thompson | 338/301 X |
| 3,020,376 | 2/1962 | Hofmann et al. | 219/203 |
| 3,330,942 | 7/1967 | Whitson | 219/522 |
| 3,388,032 | 6/1968 | Saunders | 161/183 |
| 3,532,590 | 10/1970 | Priddle | 161/183 |
| 3,539,442 | 11/1970 | Buckley et al. | 161/183 |
| 3,551,873 | 12/1970 | Weyenberg | 338/253 |
| 3,622,440 | 11/1971 | Snedeker et al. | 161/193 |

Primary Examiner—Volodymyr Y. Mayewsky
Attorney, Agent, or Firm—Edward I. Mates; William J. Uhl

[57] ABSTRACT

An electrically heated transparent window and a constant temperature control system for such transparency is disclosed. In the preferred embodiment the transparency includes a plastic interlayer material sandwiched between two rigid, transparent sheets, one of which sheets has an electrical heating means adjacent to it and in contact with the interlayer. Embedded within the plastic interlayer is a temperature sensor which is comprised of a resistance filament encapsulated within a casing material which has a heat deflection temperature greater than the plastic interlayer. Because the temperature sensor has a casing with a higher heat deflection temperature than the plastic interlayer into which it is embedded, fracture and shorting of the resistance filament against the electrical heating means, during the high temperature and high pressure conditions of laminating, are avoided. In a particular embodiment of the invention where the interlayer material is plasticized, a protective layer disposed between the interlayer and casing material to prevent hazing is disclosed.

27 Claims, 7 Drawing Figures

PATENTED JAN 29 1974

ELECTRICALLY HEATED WINDOW WITH A TEMPERATURE SENSOR

CROSS REFERENCE TO RELATED APPLICATIONS

This application is a continuation-in-part of copending application Ser. No. 199,221, filed Nov. 16, 1971, now abandoned.

BACKGROUND OF THE INVENTION

1. Field of the Invention

This invention relates generally to electrically heated transparencies and more particularly to laminated electrically heated glass-plastic windows and to a temperature control system for such windows.

2. Description of the Prior Art

Electrically heated, laminated windows have been known for some time. Such windows find wide use where it is necessary that vision through the windows be kept free of ice and fog formations. This is particularly true in aircraft, in which the windows are frequently subjected to various and extreme weather conditions. A typical electrically heated, laminated window is one which includes tow outer sheets of glass laminated to a plastic interlayer. One of the glass sheets has an inwardly facing surface covered with an electrically conductive coating, for example, a transparent metal oxide film, which contacts the plastic interlayer. Power is supplied to the film by electrodes or buss bars which are positioned along opposite marginal edges of the film and which are in electrical contact with the electrically conductive coating. To regulate the power supplied to the coating, and thus control the temperature of the window, temperature sensors are embedded in the plastic interlayer. The temperature sensors are usually resistance filaments which vary in resistance according to the surrounding temperature.

A typical and widely used temperature sensor is that disclosed in U. S. Pat. No. 2,644,065, which consists of a resistance filament encapsulated within a polyvinyl butyral casing. The sensor is inserted into an opening cut out of the polyvinyl butyral interlayer, and when the window is laminated during a high temperature autoclaving step, the temperature sensor blends with the polyvinyl butyral interlayer so as to form an integral part of the window. The temperatures needed for laminating the polyvinyl butyral interlayer to the outer glass sheets must be sufficient to soften the polyvinyl butyral. During lamination, the polyvinyl butyral flows and wets the glass, producing a strong glass-polyvinyl butyral bond. Unfortunately, this flowing at times fractures the fine resistance filaments which are embedded within the polyvinyl butyral, and at times shorts the resistance filament against the electrically conductive coating. Therefore, it would be desirable to provide a temperature sensor of the resistance filament type which can be pressed into a plastic interlayer, particularly polyvinyl butyral, during lamination without the dangers of filament fracture, or of filament shorting with an electrically conductive coating or any other electrical heating means, such as fine wires embedded into the interlayer adjacent to the outer plies of glass.

Many of the commercially availalbe polyvinyl butyral interlayers are plasticized to improve their flexibility and impact resistance. The plasticizers are generally water-insoluble esters of a polybasic acid and a polyhydric alcohol. Unfortunately, when a temperature sensor is encased in a casing material which is different than the surrounding polyvinyl butyral, it is believed that these plasticizers have a tendency to migrate to the surface of the casing material and cause it to become hazy. This is especially troublesome when the casing is a polycarbonate and when the interlayer material is plasticized polyvinyl butyral. Although the temperature sensor casing is hazy, it still functions as intended, but it is unsightly looking in the resultant laminated window.

It would therefore be desirable to provide means to inhibit the formation of haze in the casing of a temperature sensor which is embedded into a plasticized plastic interlayer, particularly plasticized polyvinyl butyral.

SUMMARY OF THE INVENTION

The invention provides a transparent window which is capable of being electrically heated, which comprises:

a. a transparent member, b. an electrical heating element supported by said member, and c. a temperature sensing element embedded in said transparent member in spaced relation to said electrical heating element; the temperature sensing element comprising a resistance filament encapsulated within a transparent casing material which has a higher heat deflection temperature than the transparent member.

DETAILED DESCRIPTION

Figure 1:
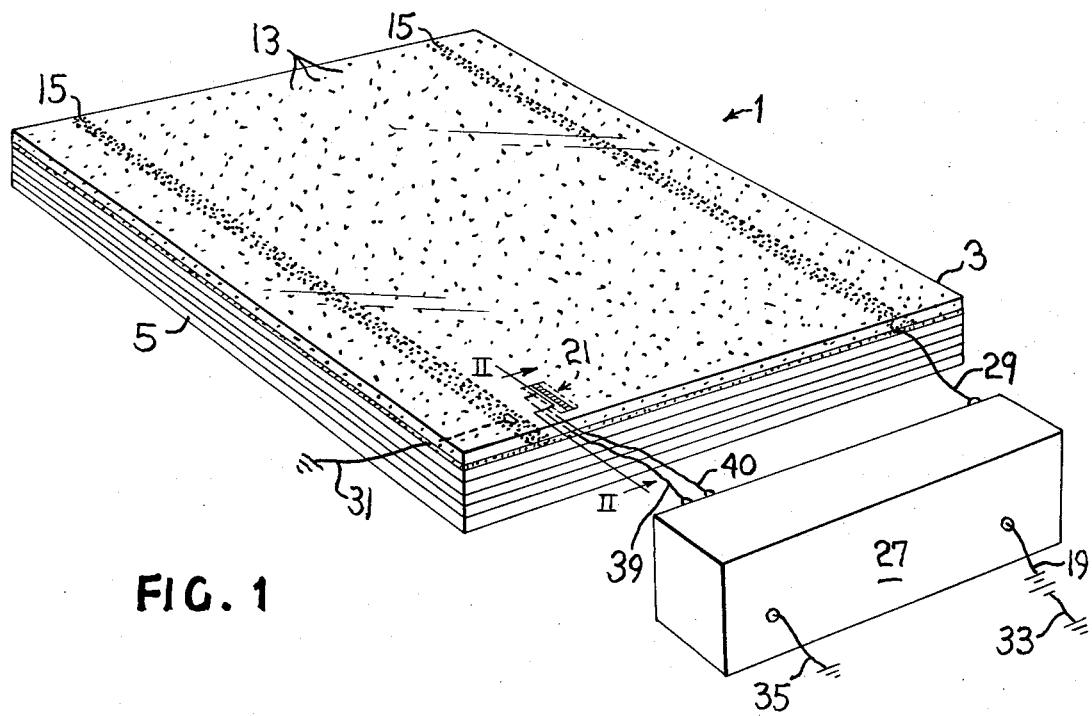
FIG. 1 shows perspectively a constant temperature laminated window system containing the temperature sensor of this invention.
Figure 2:
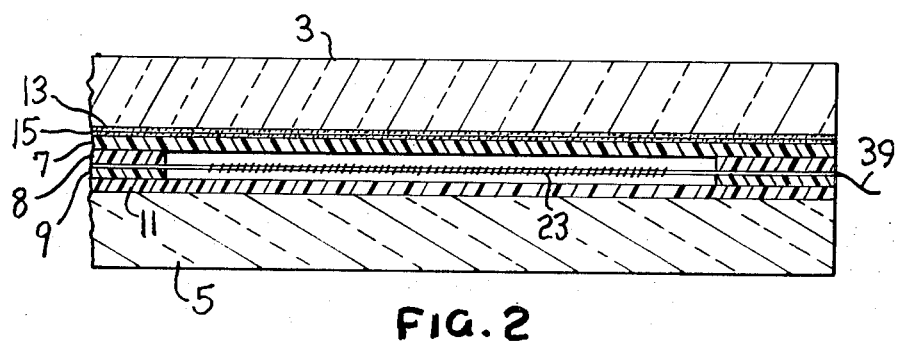
FIG. 2 is a cross-sectional view through II—II of FIG. 1.

FIGS. 1 and 2 depict a constant temperature laminated window system. The system comprises a transparent, laminated, electrically heated window 1. The window includes two rigid, transparent sheets 3 and 5, one of which has an electrically conductive coating 13 thereon. The coating is operatively connected through electrodes 15 and through a control system or controller 27 to a source of electrical energy 19. The source of electrical energy 19 will depend on the window's application. For a heated aircraft window, for example, the source of electrical energy 19 would be an alternator driven by an aircraft engine. Sandwiched between the two rigid, transparent sheets 3 and 5 is a transparent interlayer which comprises a plurality, 7, 8, 9 and 11, of plastic laminae. As is shown in the drawing, the plastic interlayer also contacts the electrically conductive coating 13. Embedded within the plastic interlayer is a temperature sensing element 21 which is shown in somewhat more detail in FIGS. 3 and 4.

Temperature sensor 21 comprises a resistance filament 23 encapsulated within a casing 25 which has a heat deflection temperature greater than the plastic interlayer material into which the temperature sensor 21 is embedded. The temperature sensor 21 is operatively connected to the source of electrical energy 19 through a controller 27. In operation, the temperature sensing element 21 responds to changes in temperature appurtenant the window 1 and in so responding, modifies, through the activity of the controller 27, the source of electrical energy so as to maintain the temperature of the window at a predetermined range. The controller 27 modifies the output voltage applied by the source of electrical energy 19. For a description of a typical controller, see U. S. Pat. No. 2,806,118 to Peterson.

Figure 5:
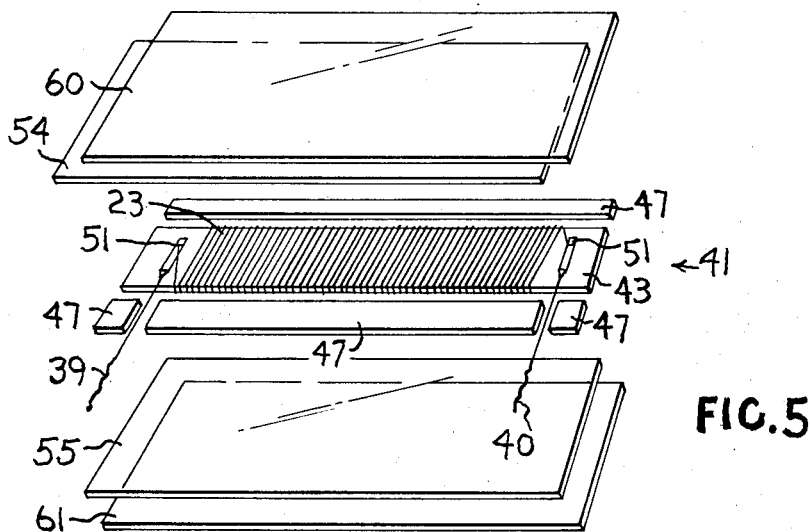
FIGS. 5 and 6 are exploded views, depicting the construction of the temperature sensor element of this invention in two alternate embodiments.
Figure 6:
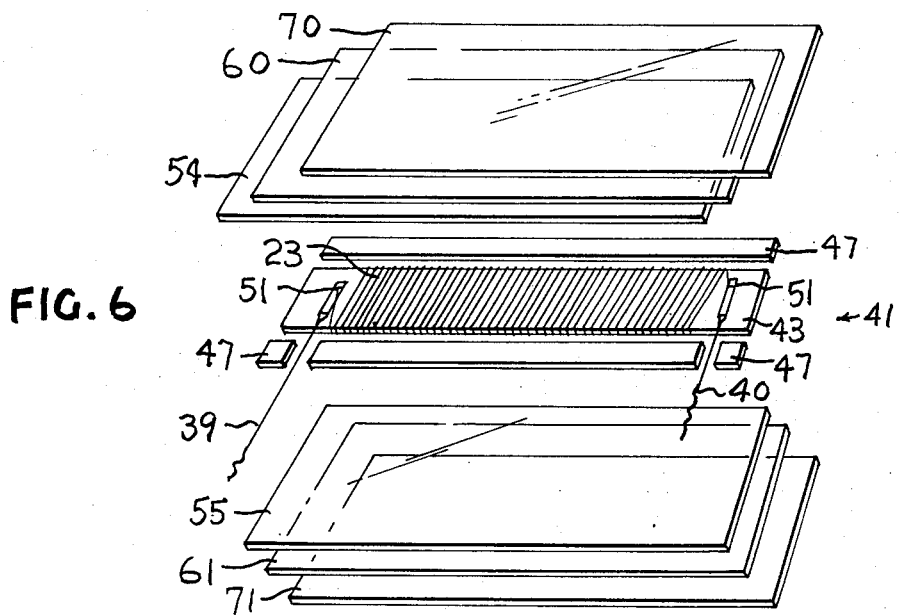

Alternate embodiments of the temperature sensor are shown in FIGS. 5 and 6. Briefly, the alternate embodiments show the disposition of a transparent, protective layer about the casing. The protective layer can be composed of two sheets 60 and 61 which are adhered to the casing. The alternate embodiments shown in FIGS. 5 and 6 will be described in detail below.

TRANSPARENT WINDOW

Referring once again to FIGS. 1 and 2, the laminated window 1 includes two rigid, transparent outer plies 3 and 5, of the same or different thickness, being approximately about 0.050 to 1.000 inch, one or both of which can be either a rigid, plastic material, like polycarbonate or acrylic sheeting, or a flat glass sheet, with glass being preferred. A transparent plastic interlayer having a thickness of 0.025 to 0.500 inch is sandwiched between the outer plies 3 and 5 and includes a plurality of laminae of plastic, 7, 8, 9 and 11, formed of polyvinyl butyral or other suitable plastic well known in the art, such as polyurethane. Polyvinyl butyral interlayer materials are described in U. S. Pat. Nos. Re. 20,430 to Morrison, 2,372,522 to Strauss and 2,496,480 to Lavin et al. Polyurethane interlayer materials are described in U. S. Pat. Nos. 3,509,015 to Wismer et al. and 3,620,905 to Ahramjian. Four plies of plastic are shown in FIGS. 1 and 2, but it should be understood that more or less than four plies can be used, depending upon the requirements the window will have to meet. An opening is provided in the interlayer of a size equal to that of the temperature sensing element 21. The element is inserted within the opening, and the individual components of the window are assembled and are laminated together such that the temperature sensor blends with the plastic interlayer so as to form an integral part of the window. As is shown in FIGS. 1 and 2, the temperature sensing element 21 is embedded in the plastic interlayer and is approximately 0.010 to 0.060 inch from the electrically conductive coating 13. Lead wires 39 and 40 are brought out from the element 21 between the plastic layers 8 and 9 to the controller 27.

Figure 7:
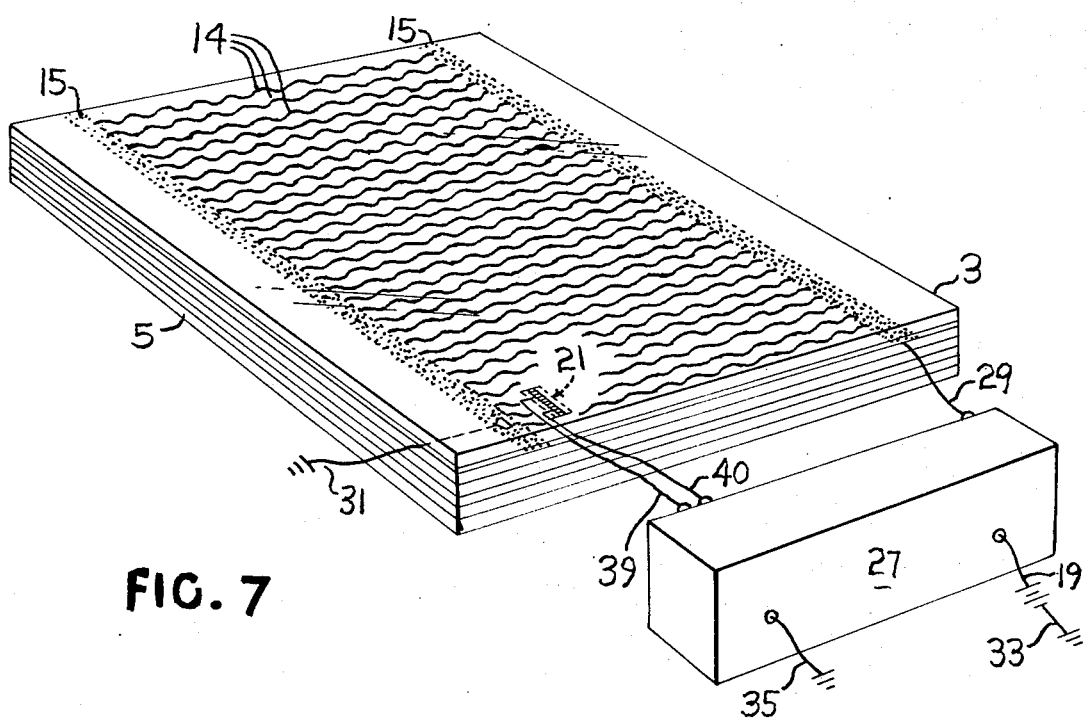
FIG. 7 shows perspectively an alternate embodiment of a constant temperature window system containing the temperature sensor of this invention.

Between the rigid, transparent outer ply 3 and the plastic interlayer is an electrically conductive, transparent coating 13, such as a metal oxide film of the type described in U. S. Pat. No. 2,614,944 to Lytle. Electrically conductive coated glass of this type is sold commercially under the trademark NESA. The coatings have a thickness of about 50 to 3500 millimicrons and are substantially transparent. (Thickness of the coating 13 in FIG. 2 is exaggerated for the purpose of illustration). When an electrical potential is applied across the coating, the electrical resistance of the coating causes it to give off heat. Generally, the electrical resistance of the coatings are below about 500 ohms per unit square, and have a specific resistivity below about 0.002 ohms-centimeters. Other transparent conductive materials, such as gold coatings and other thin metal coatings, may be used as the electrically conductive, transparent coating. Besides electrically conductive, transparent coating, other electrical heating means which are adjacent to the outer glass sheet and in contact with the interlayer can be used. An example of such a heating means are fine resistance wires which are embedded into the surface of the interlayer material adjacent to the outer glass sheet. Such a heating means is disclosed in U. S. Pat. No. 2,813,960 to Egle et al. and is shown in FIG. 7 with the fine resistance wires being shown as 14.

To bring electricity to the coating 13 or the resistance wires 14, electrodes 15, commonly called bus bars, are provided along a pair of opposed marginal edges of the coating. The bus bars 15 comprise a highly conductive metal power, preferably gold or silver, and a vitrifying binder. Bus bars are well known in the art and are typically described in U. S. Pat. No. 2,882,377 to Rinehart.

The bus bars 15 are connected to a source of electricity 19 by means of conductors 19, 31 and 33. One side of the electrical source 19 and one of the electrodes is grounded through conductors 31 and 33, respectively. The conductor 20 passes through the controller which, as has been mentioned earlier, modifies the flow of electricity to the coating to maintain the window unit 1 within a predetermined temperature range. The controller is grounded through a suitable conductor 35. It should be noted that the window can be other than the laminate configuration disclosed above. For example, the window could comprise two rigid sheets of plastic, such as acrylic, which are fusion bonded together. The heating means could be the fine resistance wires embedded into one of the sheets as described above and the temperature sensor could be embedded into the opposed sheet.

TEMPERATURE SENSOR

Figure 3:
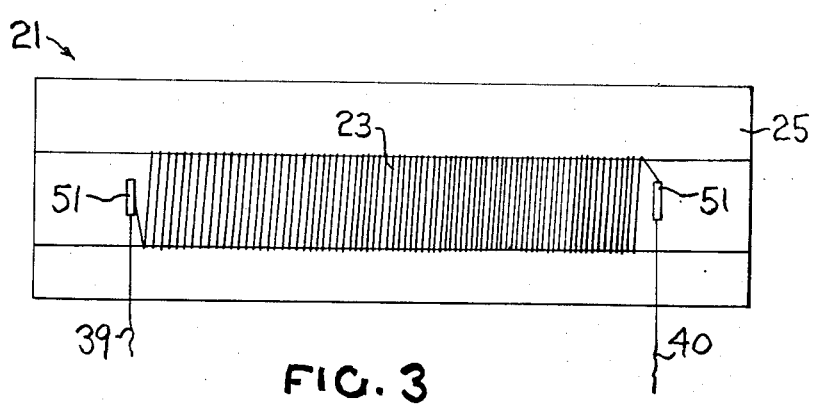
FIG. 3 is a plan view of the temperature sensor of the invention.
Figure 4:
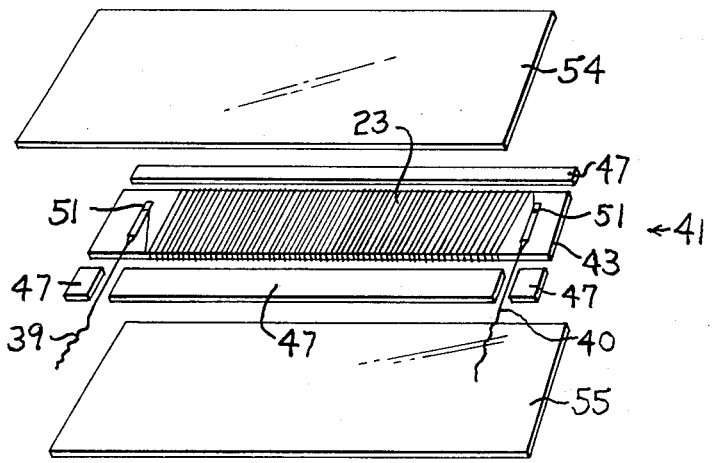
FIG. 4 is an exploded view, depicting the construction of the temperature sensor element of the invention.

The temperature sensing element 21 is shown in detail in FIGS. 3 and 4. It includes a resistance filament 23 encapsulated within a casing material 25 which has a higher heat deflection temperature than the plastic interlayer material into which the temperature sensor 21 is embedded.

In the following specific description of the temperature sensor 21, the casing material is described as being polycarbonate. However, it should be realized that other plastic materials could be used instead of polycarbonate. The selection of a casing material will depend on the interlayer material into which the temperature sensor is embedded. More particularly, the selection of the casing material will depend on the laminating temperatures and pressures which soften the interlayer, causing it to flow and wet the glass to form a strong glass-interlayer fusion bond. The casing material should not soften and flow at these temperatures, at least to an extent which will cause fracture of the encapsulated resistance filament, or which will cause shorting of the filament against the electrically conductive coating. An indication of the temperatures and pressures which will casue a material to soften and to flow is reflected in the heat deflection temperature of the material. The heat deflection temperature of plastics is defined as the measurement of the temperature at which a specific load will cause a plastic to deflect a specified amount. Procedures for determining heat deflection temperatures of plastics are set forth in A.S.T.M. D–648.

According to this invention, the casing should be selected from those materials which have a higher heat deflection temperature than the plastic interlayer into which the temperature sensor is embedded. It is also preferable that the casing be transparent, having an index of refraction similar to the interlayer, such that when the two are pressed together in the resultant laminated window, the casing of the temperature sensor will not be distractingly noticeable.

By far the most widely used plastic interlayer material is polyvinyl butyral which has a heat deflection temperature of 115°–165°F. at 66 psi as measured by A.S.T.M. D–648. Polycarbonate has been found to be especially useful as a plastic casing material for the temperature sensor with polyvinyl butyral, because polycarbonate is transparent and has an A.S.T.M. D–648 heat deflection temperature of 270°–290°F. at 66 psi. However, it should be appreciated that other transparent plastic materials for use as casing materials having a higher heat deflection temperature than polyvinyl butyral could be used. Also, if the plastic interlayer material is other than polyvinyl butyral, the plastic casing material can be selected from those plastics which will have a higher heat deflection temperature than the plastic interlayer material chosen.

As shown in FIG. 4, the temperature sensing unit 21 comprises a polycarbonate core section 41. The core section has a thickness of about 0.003 to 0.030 inch. The polycarbonate core section 41 includes a thin polycarbonate card 43, around which a resistance filament 23 is uniformly looped. Surrounding the card are a plurality of polycarbonate spacers 47 to eliminate any lens effect which may result when the various components of the temperature sensor 21 are laminated together. Located on the card 43 are weld tabs 51 which connect the resistance filament 23 with the lead wires 39 and 40. The core section 41 is encapsulated between two sheets of polycarbonate 54 and 55 by a high temperature-pressure cycle, for example, a cycle in an autoclave or a platen press. Temperatures of about 275°–390°F. and pressures of about 25–250 psi for about 5 to 120 minutes are suitable to form the temperature sensing unit 21 as depitced in FIGS. 3 and 4.

The casing 25 (which includes the core section 41) is chosen from those materials which will not cause the encapsulated resistance filament to fracture or to short against the electrically conductive coating during the laminating of the window 1. Accordingly, the transparent casing material should have a heat deflection temperature greater than the plastic interlayer material into which it is embedded. During the high temperatures and pressures which are needed in the lamination step to bond the interlayer material to the outer rigid, transparent plies, the interlayer material softens and flows. The casing material, because it has a higher heat deflection temperature than the surrounding interlayer material, does not flow, remains stable and will not cause fracture or shorting of the encapsulated filament.

When the interlayer material is polyvinyl butyral, which has a heat deflection temperature of 115°–165°F. at 66 psi, the casing material preferably is polycarbonate, which has a heat deflection temperature of 270°–290°F. at 66 psi. Polycarbonates are described in U. S. Pat. No. 3,028,365 to Schnell et al. POlycarbonates are also commercially available under the trademarks LEXAN and MERLON. Other suitable plastic encapsulating materials for use with polyvinyl butyral are, for example, cast arcylic, which has a heat distortion temperature of 175°–225°F., polystyrene, which has a heat deflection temperature of 210°–230°F., polyester, which has a heat deflection temperature of 270°–290°F., polysulfone, which has a heat deflection temperature of 350°F. and nylon, which has a heat deflection temperature of 300°–400°F. (all distortion temperatures measured at 66 psi).

It should be realized that the resistance filament can be looped about the card 43 in any particular manner or configuration. Alternately, the resistance filament does not have to be looped around a card 43, but could be merely wound in a spiral or helix configuration and molded by itself into the plastic casing 25. However, it is preferred that the resistance filament 23 be uniformly looped around a card 43. Although the card 43 has a higher heat deflection temperature than the plastic interlayer, it can be made from a different material than the sheets 54 and 55 which form the exposed casing 25. For example, the card 43 (and spacers 47) can be made from polycarbonate and the sheets 54 and 55 from acrylic.

The resistance filament 23 is a fine wire adapted to have the resistance thereof changed in response to a change in the surrounding temperature. The wire is typically about 0.0005 to 0.002 inch in diameter, having a positive temperature coefficient of resistance and having sufficient elasticity as to permit fabrication of the temperature sensing unit 21 and fabrication of the laminated window 1 without breakage and shorting.

The resistance filament should be responsive to temperatures within the range of −75°F. to 160°F., which is the ambient temperature range of typically high flying aircraft. In particular, when polyvinyl butyral is the plastic interlayer material, the resistance filament should be very sensitive to temperature changes around 100°–120°F., which is the temperature at which polyvinyl butyral has its greatest impact strength. Preferably, the change in resistance of the filament with temperature should be at least from about 100 to 150 ohms per circular mil foot at 20°C. Examples of various materials of construction which can be used to make the resistance filament are tungsten, nickel, iron-nickel alloys, with an iron and nickel alloy sold under the trademark HYTEMPCO being preferred.

The lead wires 39 and 40 should be made of a good electrical conductor, such as copper, and should be firmly attached to the resistance filament 23. As shown in FIGS. 3 and 4, the lead wires are soldered to a weld tab 51 which, in turn, is soldered to the resistance filament 23. The lead wires are generally larger in diameter than the resistance filament, having a diameter of from about 0.006 to 0.020 inch.

The weld tabs 51 are selected from electrically conducting materials which are well suited for soldering or welding. Materials having low thermal expansion coefficients, such as a nickel-iron alloy sold under the trademark KOVAR, are preferred.

Besides the individual components of the temperature sensor 21 having the above-described properties, the temperature sensor itself should have certain specific design requirements. The temperature sensor unit 21 should be capable of withstanding an extended exposure to an ambient temperature range of −75°F. to 160°F., which is the ambient temperature range of high flying aircraft. When assembled into an electrically heated window, the temperature sensor should be capable of withstanding laminating conditions that include pressures as high as 225 pounds per square inch at temperatures of 70°–350°F. Exposures to these conditions for about 30 to 120 minutes should not impair the electrical, structural or visual characteristics of the temperature sensor.

As has been mentioned above, many of the plastic interlayer materials are plasticized to prevent their eventual embrittlement. Virtually all of the commercially available polyvinyl butyral sheet interlayer material is plasticized. For example, polyvinyl butyral for use in aircraft laminates contains 21 parts by weight of monomethoxydiethylene glycol adipate per 100 parts by weight of polyvinyl butyral. Since the casing in this invention is a different material than the interlayer material, there is a possibility that the plasticizer in the interlayer material may be reactive toward the casing material of the temperature sensor. Such is the case when the casing material is the preferred polycarbonate, and the interlayer material is the widely used plasticized polyvinyl butyral. It is believed that the plasticizer migrates from the polyvinyl butyral to the surface of the plastic casing, interacts with the polycarbonate, causing it to become hazy. This hazing, although not affecting the performance of the temperature sensor, gives the sensor a distracting, unsightly appearance in the resultant laminated window.

This hazing of the plastic casing can be avoided if a protective layer is positioned about the exterior surface of the casing. In the resultant laminated window, the protective layer will be disposed between the casing of the temperature sensor and the interlayer into which the temperature sensor is embedded.

The protective layer should adhere well to both the plasticized interlayer and to the casing material. The protective layer should be transparent, having approximately the same index of refraction as both the interlayer material and the casing. This minimizes optical distortion in the resultant laminated window. Also, the protective layer should not seriously affect the temperature sensing capabilities of the temperature sensor.

An example of a suitable protective layer, when the temperature sensor casing is polycarbonate, and the interlayer material is plasticized polyvinyl butyral, is acrylic. In general, acrylics are composed principally of one or more of the polymerized lower alkyl esters of methacrylic acid, such as methyl methacrylate, ethyl methacrylate, isopropyl methacrylate and isobutyl methacrylate. There may also be used copolymers from lower alkyl esters of methacrylic acid or mixtures of such esters in predominant amounts together with lesser amounts of another polymerizable unsaturated compound which is miscible or compatible thereiwth, such as an ester of acrylic acid; examples of which are ethyl acrylate and butyl acrylate. Acrylics are commercially available under the trademark KORAD in film and sheet form having a thickness of 0.003 to 0.012 inch and are preferred in the practice of this invention.

The protective layer can be disposed between the casing of the temperature sensor and the surrounding polyvinyl butyral in a number of ways. If available in a liquid form, it can be brushed, coated or sprayed onto the casing of the temperature sensor. When applied in this way, care must be taken to insure that the coating is even to avoid any optical distortion. When the protective material is available in film or sheet form, it may be laminated directly to the casing of the temperature sensor. For example, as shown in FIG. 5, two layers 60 and 61 of acrylic are positioned on the exposed outer surfaces of the temperature sensing element. The composite is then subjected to a suitable high pressure and temperature cycle for lamination. For example, when the temperature sensor casing is made from polycarbonate and the protective layer is an acrylic cladding material, such as that available under the trademark KORAD, an autoclaving cycle using temperatures of about 250°–390°F. and pressures of about 25–250 psi for about 5 to 60 minutes is suitable to form the resultant protected temperature sensing unit. Another way of disposing the protective layer between the temperature sensor and the surrounding interlayer material is to cut a section out of the interlayer material which corresponds to the size of the temperature sensor. The resistance filament encapsulated within a casing and sandwiched between two protective layers 60 and 61 is then inserted into this opening. The remaining layers of the interlayers and the rigid outer sheets 3 and 5 are then assembled and prepared for lamination. When the components of the window are laminated together during the high temperature and high pressure autoclaving, the temperature sensor and protective layer blends with the polyvinyl butyral interlayer so as to form an integral part of the resultant laminated window. If the protective material has a higher heat deflection temperature than the interlayer material, it can itself be used as the casing material. For example, when the interlayer material is plasticized polyvinyl butyral, it is preferred that the temperature sensor construction include a polycarbonate core section and an acrylic casing.

Depending on the selection of the interlayer material and the casing of the temperature sensor, it may be necessary to provide an adhesive between the interlayer and the casing to prevent delamination. Care should be taken, of course, that the adhesive not attack the interlayer or the casing causing haziness or optical distortion. For example, when the interlayer material is plasticized polyvinyl butyral and the casing or the protective coating for the casing is an acrylic cladding, a polyurethane adhesive is suitable. Preferred polyurethanes are the thermoplastic type, such as are disclosed in U. S. Pat. Nos. 2,871,218 and 2,899,411, both to Schollenberger, and which are sold under the trade mark TUFTANE. The thermoplastic polyurethanes are available in film and sheet form having thicknesses of 0.001 to 0.20 inch.

The adhesive can be inserted between the interlayer and the casing in a number of ways. If available in liquid form, it can be brushed, coated or sprayed onto the casing of the temperature sensor. When available in sheet or film form, the adhesive can be laminated directly to the protected casing of the temperature sensor. For example, as is shown in FIG. 6, two layers 70 and 71 of a suitable adhesive, such as polyurethane film, are positioned on the exposed outer surface of an acrylic clad temperature sensor. The acrylic clad temperature sensor and the polyurethane protective layers are then subjected to a suitable high temperature-pressure cycle to laminate the acrylic to the polycarbonate casing. For example, temperatures of about 250°–390°F. and pressures of about 25–100 psi for about 5 to 60 minutes are suitable to laminate the polyurethane to the acrylic. Another way of inserting a protective foil between the polycarbonate casing and the polyurethane protective layer is to cut a section out of the interlayer material which corresponds to the size of the temperature sensor. A composite, as is shown in FIG. 6, generally comprising a temperature sensor with a polycarbonate casing, two acrylic protective foils 60 and 61, and two polyurethane adhesive layers 70 and 71, is inserted into the opening. The remaining laminae of the interlayer and the rigid outer sheets 3 and 5 are then assembled and prepared for lamination. When the components of the window are laminated together during high temperature and high pressure autoclaving, the protected temperature sensor blends with the polyvinyl butyral interlayer so as to form an integral part of the resultant laminated window.

I claim:

1. A transparent window which is capable of being electrically heated, comprising in combination:
   a. a transparent rigid sheet and a transparent plastic sheet,
   b. an electrical heating element for heating said window embedded within said window and supported by at least one of said sheets,
   c. a temperature sensing element having an electrical resistivity sensitive to a change in temperature embedded in said transparent plastic sheet in spaced relation to said electrical heating element; the temperature sensing element comprising a resistance filament hermetically encapsulated within a transparent casing material which has a higher heat deflection temperature than the transparent plastic sheet, and
   d. electrical leads electrically coupled to said temperature sensing element and extending through said casing and through at least a portion of said transparent plastic sheet and adapted for connection to a control system.

2. The window of claim 1 in which the transparent window comprises a plurality of transparent rigid sheets.

3. The window of claim 2 in which the transparent window comprises a plurality of transparent rigid sheets laminated together with said plastic sheets as an interlayer, the temperature sensing element being embedded in said interlayer.

4. The window of claim 3 in which the electrical heating element comprises fine resistance wires embedded in said interlayer.

5. The window of claim 3 in which the electrical heating element is an electrical conductive coating on at least one of said rigid sheets.

6. The window of claim 3 in which the plastic interlayer is polyvinyl butyral.

7. The window of claim 6 in which the polyvinyl butyral is plasticized.

8. The window of claim 6 in which the casing material is an organic composition taken from the classs consisting of poly-carbonate and acrylic.

9. The window of claim 7 in which the casing material is polycarbonate and a protective coating is disposed between the casing and the interlayer.

10. The window of claim 9 in which the protective coating is acrylic.

11. The window of claim 10 in which an adhesive is inserted between the interlayer and the protective coating.

12. The window of claim 11 in which the adhesive is polyurethane.

13. The window of claim 8 in which the casing material is acrylic and a polyurethane adhesive is inserted between the interlayer and the casing.

14. A transparent, laminated window which is capable of being electrically heated, comprising in combination:
   a. a plurality of transparent, rigid sheets, at least one of which has an electrical heating means on an inwardly facing surface thereof for heating said window,
   b. a plastic interlayer disposed between two of said rigid sheets and contacting said electrical heating means,
   c. a temperature sensing element having an electrical resistivity sensitive to a change in temperature embedded in said interlayer in spaced relation to said electrical heating means, which element comprises a resistance filament hermetically encapsulated within a transparent casing material which has a higher heat deflection temperature than the interlayer material, and
   d. electrical leads electrically coupled to said temperature sensing element and extending through said casing and said interlayer and adapted for connection to a control system.

15. The constant temperature window system of claim 14 in which the transparent window comprises two rigid sheets.

16. The constant temperature window system of claim 14 in which the electrical heating means comprises an electrically conductive coating on at least one of said rigid sheets.

17. The constant temperature window system of claim 14 in which the plastic interlayer is polyvinyl butyral.

18. The constant temperature window system of claim 17 in which the polyvinyl butyral is plasticized.

19. The constant temperature window system of claim 17 in which the casing material is composed of a plastic composition taken from the class consisting of polycarbonate and acrylic.

20. The constant temperature window system of claim 18 in which the casing material is polycarbonate and a protective coating is disposed between the casing and the interlayer.

21. The constant temperature window system of claim 20 in which the protective coating is acrylic.

22. The constant temperature window system of claim 21 in which an adhesive is inserted between the acrylic and the interlayer.

23. The constant temperature window system of claim 22 in which the adhesive is polyurethane.

24. The constant temperature window system of claim 19 in which the casing material is acrylic and a polyurethane adhesive is inserted between the casing and the interlayer.

25. A constant temperature window system comprising in combination:
   a. an electrically heated transparent window which includes:

i. a transparent rigid sheet and a transparent plastic sheet;
ii. an electrical heating element for heating said window embedded within said window and supported by said transparent plastic sheet and being operatively connected to a source of electrical energy;
iii. a temperature sensing element having an electrical resistivity sensitive to a change in temperature embedded in said transparent plastic sheet in spaced relation to said electrical heating element; the temperature sensing element comprising a resistance filament hermetically encapsulated within a transparent casing material which has a higher heat deflection temperature than the transparent plastic sheet,
iv. electrical leads for operatively connecting said electrical heating element and said temperature sensor to the same source of electrical energy; whereby the temperature sensing element responds to changes in temperature appurtenant said window and modifies the source of electrical energy so as to maintain the temperature of the window at predetermined range.

26. The constant temperature window system of claim 25 in which the electrical heating means comprises fine resistance wires embedded in said interlayer.

27. A constant temperature window system comprising in combination:

a. a transparent, laminated, electrically conducting window which includes:
   i. a plurality of rigid, transparent sheets and a plastic interlayer which has an electrical heating means embedded therein and which electrical heating means is operatively connected to a source of electrical energy;
   ii. said plastic interlayer being disposed between two of said sheets and contacting the electrical heating means;
b. a temperature sensing element having an electrical resistivity sensitive to a change in temperature embedded in said interlayer in spaced relation to said electrical heating means, the temperature sensing element including:
   i. a resistance filament hermetically encapsulated within a casing material which has a higher heat deflection temperature than said interlayer material,
   ii. electroconductive means operatively connecting said electrical heating means and said temperature sensing element to the same source of electrical energy;
whereby the temperature sensing element responds to changes in temperature appurtenant said window and modifies the source of electrical energy so as to maintain the temperature of the window at a predetermined range.

* * * * *

UNITED STATES PATENT OFFICE
CERTIFICATE OF CORRECTION

Patent No. 3,789,192           Dated January 29, 1974

Inventor(s) Robert G. Spindler

It is certified that error appears in the above-identified patent and that said Letters Patent are hereby corrected as shown below:

Column 1, line 24, "tow" should be --two--

Column 1, line 29, "buss" should be --bus--

Column 4, line 26, second occurrence of "19" should be --29--

Column 4, line 29, "20" should be --29--

Column 6, line 4, "POlycarbonate" should be --Polycarbonate--

Column 9, Claim 8, line 63, "classs" should be --class--

Column 10, Claim 15, line 35, after "two" insert --transparent--

Column 11, Claim 25, line 24, insert --a-- after "at"

Signed and sealed this 16th day of July 1974.

(SEAL)
Attest:

McCOY M. GIBSON, JR.        C. MARSHALL DANN
Attesting Officer             Commissioner of Patents